US006840861B2

(12) United States Patent
Jordan et al.

(10) Patent No.: US 6,840,861 B2
(45) Date of Patent: Jan. 11, 2005

(54) METHOD AND APPARATUS FOR INTERACTIVE REAL TIME DISTRIBUTED GAMING

(76) Inventors: Kent Wilcoxson Jordan, 7100 Trask Ave., Playa Del Rey, CA (US) 90293; José Maria de Veiga Fernandes, 1233 Barry Ave., #208, Los Angles, CA (US) 90025

(*) Notice: Subject to any disclaimer, the term of this patent is extended or adjusted under 35 U.S.C. 154(b) by 379 days.

(21) Appl. No.: 09/989,258

(22) Filed: Nov. 20, 2001

(65) Prior Publication Data

US 2002/0115489 A1 Aug. 22, 2002

Related U.S. Application Data

(60) Provisional application No. 60/252,118, filed on Nov. 20, 2000.

(51) Int. Cl.[7] .................................................. A63F 9/24
(52) U.S. Cl. ........................ 463/42; 700/91; 340/323 R
(58) Field of Search .............................. 463/40–42, 1–5, 463/30, 36, 16–17, 9; 273/460; 700/91–92; 340/323 R; 379/93.13

(56) References Cited

U.S. PATENT DOCUMENTS

| 4,141,548 A | * | 2/1979 | Everton |
| 4,496,148 A | * | 1/1985 | Morstain et al. |
| 4,592,546 A | * | 6/1986 | Fascenda et al. |
| 4,918,603 A |   | 4/1990 | Hughes et al. ............. 364/410 |
| 5,643,088 A | * | 7/1997 | Vaughn et al. |
| 6,434,398 B1 | * | 8/2002 | Inselberg |

OTHER PUBLICATIONS

Screen shot of ABC's Enhanced TV found at http://.heavy.etv.go.com/, 5 pages.
Screen shot of Buzz Time—Predict the Play found at http://www.predicttheplay.com/, 5 pages.
Screen shot of Madden 2002 found at http://www.ea.com/easports/platforms/pccd/games/madden2002/home.jsp, 2 pages.

* cited by examiner

*Primary Examiner*—Mark Sager
(74) *Attorney, Agent, or Firm*—McAndrews, Held & Malloy, Ltd.

(57) ABSTRACT

The present invention relates to a method for playing an interactive real time distributed game including receiving at a scoring database a next play prediction for a sporting event from a remote terminal, determining an actual play outcome for the sporting event, transmitting an actual play outcome representation to the remote terminal, and scoring the play prediction based on the actual play outcome and a predetermined offensive scoring ruleset. In one embodiment, the sporting event is a football game.

19 Claims, 13 Drawing Sheets

METHOD AND APPARATUS FOR INTERACTIVE REAL TIME DISTRIBUTED GAMING

This application is related to, and claims benefit of and priority from, Provisional Application No. 60/252,118 dated Nov. 20, 2000, titled "Method and Apparatus for Interactive Real Time Distributed Gaming", the complete subject matter of which is incorporated herein by reference in their entirety.

FEDERALLY SPONSORED RESEARCH OR DEVELOPMENT

[Not Applicable]

BACKGROUND OF THE INVENTION

The present invention relates to interactive gaming. In particular, the present invention relates to interactive distributed gaming in real time based on an associated sporting event.

Spectator sports commonly draw individuals who are adept (so they believe) at knowing every play a team will (or should) execute. For example, ranks of "armchair quarterbacks" fill living rooms, bars, and sports arenas every Sunday and Monday during the professional football season. While many of these individuals are convinced that their knowledge surpasses that of the best professional coaches, companies have only recently begun to provide ways to measure such prowess.

As one example, Buzztime, Inc. has designed the QB1 interactive game accessible at the website http://foxsports.com/qb1/index.html. QB1 allows a participant to predict, using a web browser user interface, the next offensive play that a football team will pursue. In QB1, the participant selects either RUN or PASS as their basic prediction. A correct prediction awards points, while an incorrect prediction subtracts to predict, using a web browser user interface, the next offensive play that a football team will pursue. In QB1, the participant selects either RUN or PASS as their basic prediction. A correct prediction awards points, while an incorrect prediction subtracts points from the participant's score. Participants earn more points by predicting more complex plays formed from a direction: LEFT, RIGHT, MIDDLE, and distance BACK, SHORT, DEEP, for example PASS-MIDDLE-DEEP. A bewildering array of possible predictions are possible, with the additional complication that certain combinations are valid only for RUN or PASS situations.

As another example, ABC provides the Prime Time Player™ game based at http://heavy.etv.go.com/etvHome/etvfootball. Participants in Prime Time Player predict, through a web browser interface, one of four offensive positions (quarterback, wide receiver, running back, or tight end) that will end up with the ball at the end of the play. The participant accumulates points for choosing the correct offensive position and bonus points based on yardage gained. However, Prime Time Player can be somewhat intimidating for casual football viewers who, for example, may not know a tight end from a wide receiver.

The drawbacks associated with prior interactive games not only limited the number of participants in the games and the resultant level of competition, but also the generated revenue streams. Furthermore, such prior interactive games were generally limited to web browser interfaces. As a result, a large number of potential participants without access to an Internet enabled personal computer (e.g., those attending a sporting event, for example) could not play.

A need exists for an interactive game that addresses the problems noted above and others previously experienced.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Features of the present invention may be found in a method and apparatus for interactive real time distributed gaming. In one embodiment, a method for playing an interactive real time distributed game includes receiving at a scoring system and database a next play prediction for a sporting event from a remote terminal, determining an actual play outcome for the sporting event, transmitting an actual play outcome representation to the remote terminal, and scoring the play prediction based on the actual play outcome and a predetermined offensive scoring ruleset. In one embodiment, the sporting event is a football game.

Thus, for example, the next play prediction may be a yardage prediction (e.g., a gain of 1–5 yards, 6–10 yards, 11–15 yards, 16–20 yards, 21–25 yards, or 25+yards), or a scoring prediction (e.g., a touchdown, field goal, two point conversion, or point after touchdown), or a touchdown in combination with a yardage prediction. Points are awarded according to the offensive scoring ruleset, for example, when the next play prediction is a correct yardage prediction, a correct scoring prediction, or a correct touchdown and yardage prediction. Optionally, the interactive game may include scoring for defensive plays. Thus, the remote terminal may also receive a defensive play outcome representation and score the defensive play outcome according to a predetermined defensive scoring ruleset.

No particular terminal type is required, and thus, as examples, the remote terminal may be an Internet enabled personal computer, a wireless personal digital assistant device (PDA), a cellular phone communicating over a radio channel, or a television browser communicating over a television channel. The interactive game is described in much greater detail below with reference to an interactive football game.

Other aspects, advantages and novel features of the present invention, as well as details of an illustrated embodiment thereof, will be more fully understood from the following description and drawings, wherein like numerals refer to like parts.

DETAILED DESCRIPTION OF THE INVENTION

One implementation of the interactive real time distributed game (referred to below generally as "iTrackZONE") is specifically discussed below with reference to an interactive football game (referred to as "iTrackZONE Football") based on a live professional, college, or arena football game. Note, however, that iTrackZONE is not limited to football games. Rather, iTrackZONE may incorporate rulesets for any other competitive activity, including baseball, hockey, chess, billiards, bowling, and the like.

Prior to each game of iTrackZONE Football, each game-player preselects a field-team to represent, preferably for the duration of each iTrackZONE Football game (or "game-session"). The duration of a game-session coincides with the duration of the underlying football game (or "field-game"). As will be described in more detail below, each game-player submits a prediction for each field-team offensive play prior to the start of each play (e.g., the snap of the football). The game-player scores and accumulates points for each correct prediction of the outcome of offensive plays for the field-team during the field-game.

Figure 1:
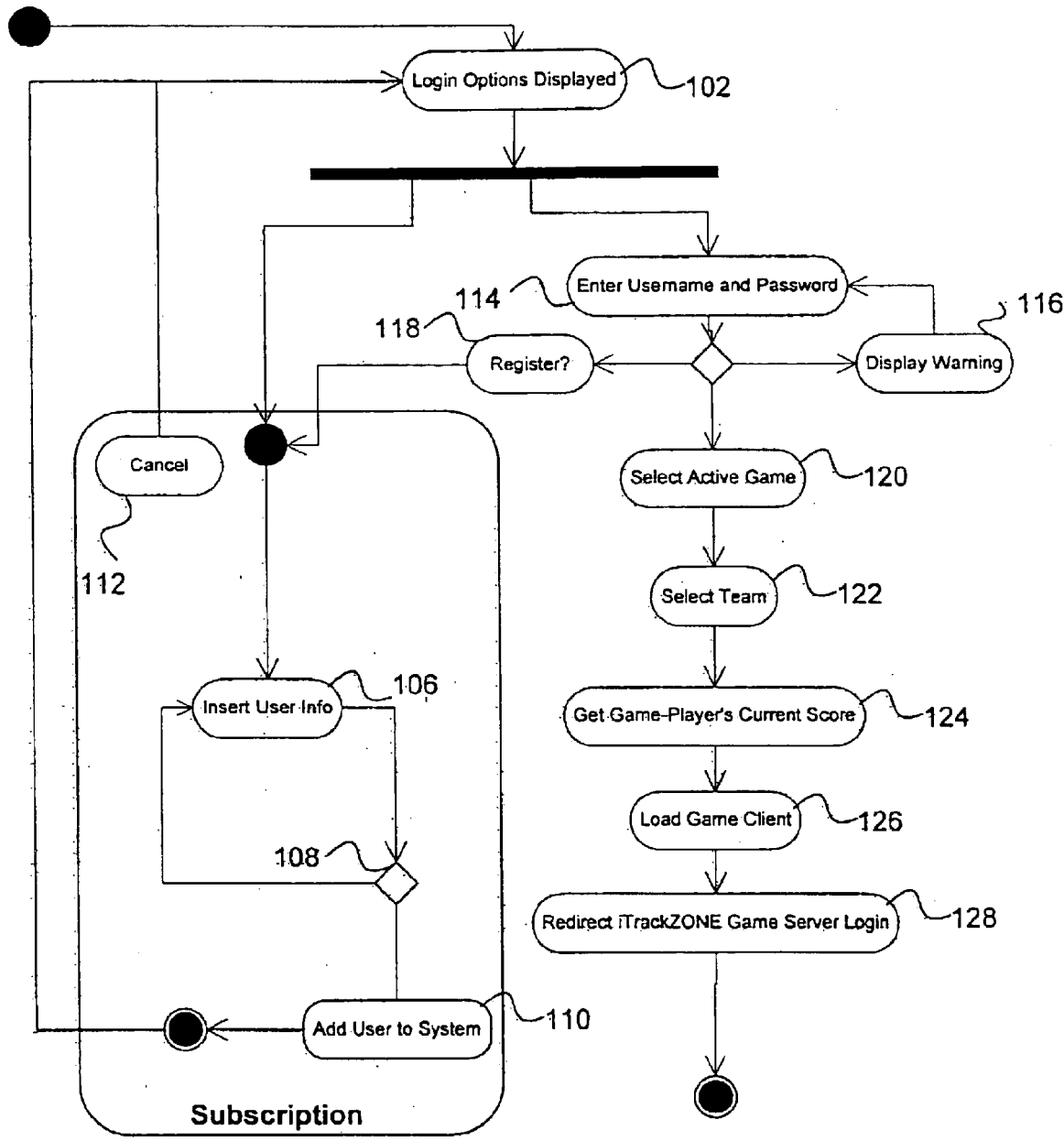
FIG. 1 illustrates a flow diagram of game-player registration and log-on in accordance with one embodiment of the present invention.

As an initial matter, however, and with reference to FIG. 1, a potential game-player first registers and logs onto 100 the iTrackZONE Football system (or "game-server-system"). The login server presents login options 102 to the potential game-player, including whether to register as a new game-player, update existing game-player information, or whether to log in and begin play. When registering as a new game-player, the registrant enters subscription information 106 including, as examples, name, address, credit card information, and display set options to receive information about other products and services offered through iTrackZONE. Subsequently, the game-server-system validates 108 the address and other required pertinent information, and if successful, adds the new game-player to the game-sever-system database 110. If the game-server-system cannot collect the required information, the game-server-system returns to step 106 where the registrant may correct the requested subscription information. A game-player may also opt to cancel 112 their subscription to iTrackZONE Football, in which case their subscription is appropriately marked in the game-server-system database.

Once a game-player is registered in the game-server-system database, the game-player may then logon by entering a valid username and password 114. An invalid username or password may cause the game-server-system to display 116 an associated warning 116, or query the individual trying to logon whether they need to first register 118. The game-server-system preferably allows a game-player to logon at least 30 minutes prior to initiation of the field-game (e.g., kickoff) and until the end of regulation play of the field-game, including overtime.

Once the game-player has logged in, the game-player selects a pre-scheduled field-game that is either going to start soon 120, or that is already in progress and selects and commits to one field-team 122 (from one or more lists of pre-scheduled field games presented by the game-server-system to the game-player) for the duration of that particular field-game and game session. Next, the game-server-system retrieves the game-player's current score 124 (if any) associated with the selected field-game and field-team. The current score may be zero, for example, if the game-player is logging in for the first time, and may be non-zero if the game-player was playing, but had logged out for a period of time and is returning.

Subsequently, the game-player's remote terminal loads and executes the iTrackZONE Football client software 126. For example, the client software may include a Java, HTML, WAP or ATVEF based user interface for a personal computer, a compiled executable software application for a cell phone, pager, or Palm Pilot or other PDA, or TV set-stop box. The client software, as described in more detail below, also includes scoring rulesets for the underlying sporting event (in this case football). Once the remote terminal loads the client software, the remote terminal connects to a selected game-server 128 that is handling the game-session.

The game-server connection may be synchronous or asynchronous, depending on the remote terminal (whether an interactive TV set-top-box, a wireless PDA, a web enabled cell phone, a web-pad, a computer with an internet connection, or any other internet connected device, or any device with two-way digital communication capability). The game-server connection communicates with the game-player as described in more detail below during the game-session. Note that the game-player may log off the game-server at anytime during the game-session without jeopardizing any accumulated points. The game-player may log on again during the same game-session (i.e., until the end of regulation play of the field-game, including overtime). The end of regulation play concludes the iTrackZONE Football game-session.

The game-session starts when the field-game starts. Up to three minutes before the opening kickoff, the game-player may submit a next play prediction. After the opening kickoff, the game-session is considered active throughout the duration of the field-game. Generally, the game-server establishes field-teams as either in an offensive-state or a defensive-state. A field-team is in offensive-state when that field-team has possession of the football for example. A field-team is in defensive-state when that field-team does not have possession of the ball for example.

The game-server further establishes a play-action-state that starts when a game-player's field-team snaps the football for example. Before each play-action state there is a waiting period. The waiting period, referred to as the play-stopped-state, is the period of time between two consecutive play-action states. While in the play-stopped state, the game-server accepts next play predictions during the submit-prediction-mode as indicated below.

The game-server establishes two game-play-modes associated with a game-player: passive-mode or active-mode.

The attributes of the game-play-modes and the transfer from one to another is dependent on the actions of the game-player's selected field-team during the field-game. When the selected field-team is in an offensive-state the game-player is in active-mode. When the selected field-team is in a defensive-state the game-player is in a passive-mode.

The game server and remote terminal allow the game-player to submit next play predictions for the game-player's field-team when the game-player is in the active-mode and the field-team is in the play-stopped-state (i.e., when the game-server establishes that a submit-prediction-mode exists). Preferably, the play-stopped-state starts from the end of the previous play (e.g., from the official spot or placement of the football by a game referee) to the next break of the field-team huddle.

The game server further establishes, as a play-action-state, the period of time when the field-teams line up at the line of scrimmage to run a play until the play ends with the official's whistle and an official ruling (e.g., a spotting of the ball). Preferably, game-players are not allowed to submit next play predictions during the play-action-state; in other words, the game-server establishes a non-submit-mode. Generally, iTrackZONE Football referees determine the start and stop of the play-action-states and therefore determine the duration of the submit-play-states and non-submit-modes.

When the field-team that the game-player has pre-selected loses possession of the football, the field-team assumes a defensive-state. At that time, the game-player is placed in a passive-mode and can no longer make next play predictions until the field-team regains possession of the football and assumes the offensive-state. Thus, the field-team moves between the offensive-state and the defensive-state throughout the game-session.

The game-server sends a message to the remote terminal to alert the game-player that the mode is switching from passive-mode to active-mode. The remote terminal, in response, generally presents a mode change indicator (e.g., a text message, sound, or graphic) to the game-player. The game-player may then select and submit a next play prediction.

Generally, a next play prediction attempts to prognosticate the next play that the field-team will execute. Although next play predictions may be placed with regard to both offense and defense, in the preferred embodiment, next play predictions are only allowed when a game-player's selected field team is in the offensive state, game-player is in the active-mode and the field-team is in the play-stopped-state.

Preferably, when the state is the submit-play-state, and the game-player is in active-mode, the game-player can predict the outcome of a field-game offensive play by making a yardage-prediction (and optionally specifying that a touchdown will also be scored) or making a scoring prediction (Field Goal, Point After Touchdown, or Two Point Conversion). Alternatively, the game-player may choose to not make a next play prediction, without jeopardizing any points already accumulated. Table 1, below, illustrates the preferred yardage predictions and Table 2 illustrates the preferred scoring predictions (although a plurality of other yardage and scoring predictions may also be implemented):

TABLE 1 yardage predictions

1–5 yards
6–10 yards
11–15 yards
16–20 yards

TABLE 1-continued yardage predictions

21–25 yards
25 or more yards

TABLE 2 scoring predictions

Touchdown
Field Goal
Two Point Conversion
Point After Touchdown

Tables 1 and 2 thus illustrate one embodiment of an offensive play ruleset that defines the predictions a game-player may make.

Preferably, the next play prediction for a yardage prediction is one of the alternatives illustrated in Table 1, optionally also specifying a scoring prediction, a touchdown for example. Alternatively, the next play prediction may be a single scoring prediction selected from Table 2, although selecting a touchdown also allows the game-player to select a yardage option from Table 1.

The game-player presses a button (i.e., a Submit button) on the remote terminal to submit the next play prediction (if any) to the game-server. The game-player must submit the next play prediction before the game-system changes from the play-stopped state to the play-action state. In one implementation, a next play prediction is irrevocable and places the game-player into a non-submit-mode. In other words, the game player cannot place a different next play prediction until the next submit-play-state. Note also that if the game-player fails to submit a next play prediction, any yardage or scoring selections are discarded without being scored.

An offensive scoring ruleset determines how points are allocated based on the next play prediction. As an example, Table 3 illustrates the points awarded for a correct yardage prediction, while Table 4 shows the points awarded for a correct scoring prediction. Other offensive scoring combinations are contemplated.

TABLE 3 offensive scoring ruleset for yardage predictions

| Next play prediction | Points awarded if correct | Points awarded (subtracted) if incorrect |
|---|---|---|
| 1–5 yards | 5 | 0 |
| 6–10 yards | 5 | 0 |
| 11–15 yards | 5 | 0 |
| 16–20 yards | 5 | 0 |
| 21–25 yards | 5 | 0 |
| 25 or more yards | 5 | 0 |

TABLE 4 offensive scoring ruleset for scoring predictions

| Next play prediction | Points awarded if correct | Points awarded (subtracted) if incorrect |
|---|---|---|
| Touchdown | 6 | (6) |
| Field Goal | 3 | (3) |

TABLE 4-continued offensive scoring ruleset for scoring predictions

| Next play prediction | Points awarded if correct | Points awarded (subtracted) if incorrect |
|---|---|---|
| Two Point Conversion | 2 | (2) |
| Point After Touchdown | 1 | (1) |

In one implementation, game-players watch the field-game passively while their field-team is in the defensive-state. The game-server then awards points to the game-player automatically according to the defensive scoring ruleset shown in Table 5:

TABLE 5 defensive scoring ruleset

| Event | Points awarded |
|---|---|
| Quarterback sack | 5 |
| Tackle for yardage loss | 2 |
| Fumble recovery | 3 |
| Interception | 3 |
| Safety | 2 |
| Defensive Touchdown | 6 |

Note, however, that in other implementations of iTrackZONE Football, the game-player may also submit defensive next play predictions according to a predetermined defensive next play ruleset.

The game-server automatically updates each game-player's point total after every play during the game-session. Preferably, point total scoring leaders are displayed on a leader board on the remote terminal. At the end of the field-game a game-player's point total is recorded and ranked against all other players, for example, by team, city, region and nation. The highest ranking game-players may then be determined according to each category and point total. Furthermore, the game-server may define numerous point totals corresponding to certain prizes or awards. A game-player's point total may be exchanged for a prize, or may be allowed to accrue for more valuable prizes at a future date.

With reference to competition among game-players, all game-players on all platforms may competing against each other to gain the most points. Team play will be supported. Individual players can team up and compete against other teams of the same number (e.g., up to four per side). Individual or team point leaders may, for example, be divided into team, game, city, regional, and national leader board groups. Leader boards are preferably posted after every game and season totals may also be posted with a league MVP, All-Star teams for each of the two conferences and MVPs for each team. Grand prizes (e.g., vacations, season tickets, mountain bikes, skis, and the like) may be awarded at the end of the season to the game-players with the highest point totals, and smaller prizes (e.g., T-shirts, magazine subscriptions, and the like) may be awarded, for example, to the top 1,000 finishers overall.

Figure 2:
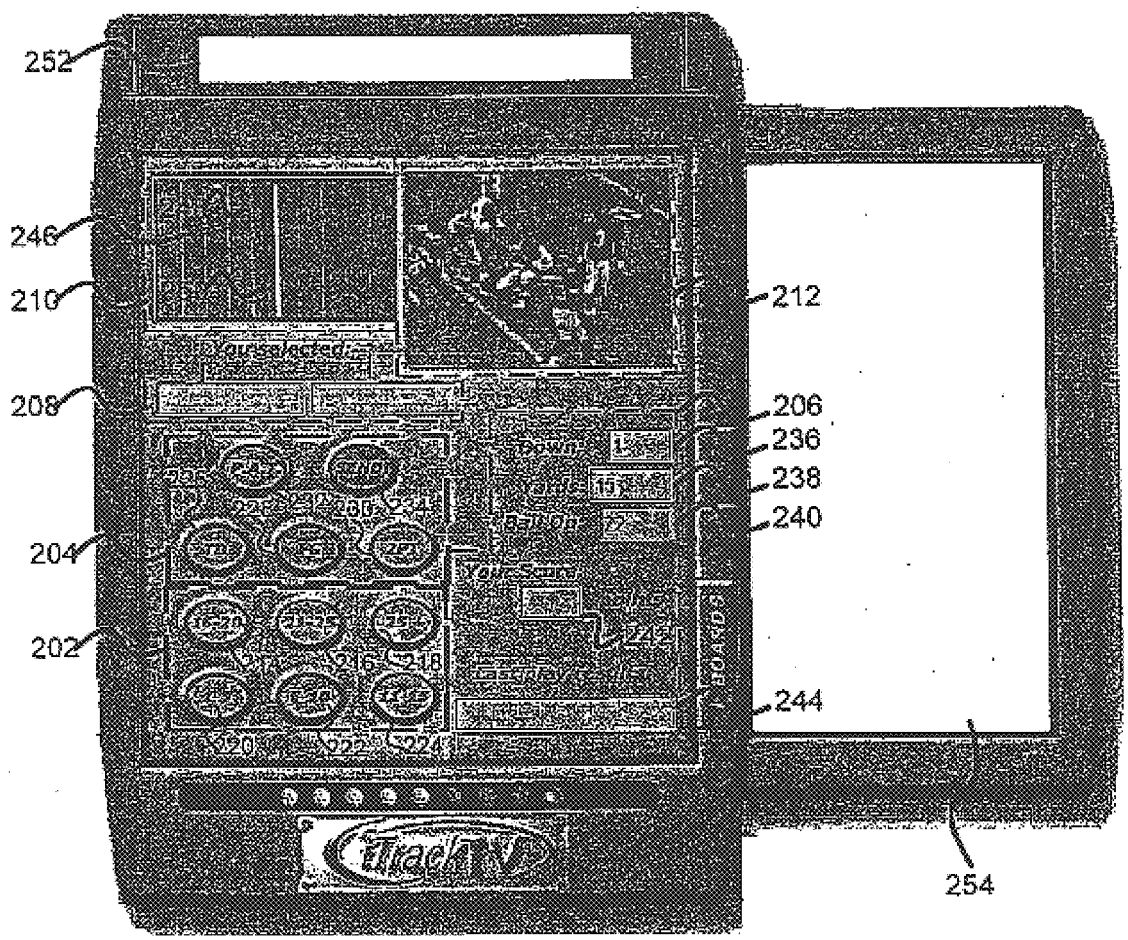
FIG. 2 illustrates one implementation of a modular game interface console in accordance with one embodiment of the present invention.

Turning next to FIG. 2, that figure illustrates one implementation of a modular game interface console 200. The console 200 is suitable for a browser used with personal computers and interactive TV (e.g., through WebTV and AOLTV). The modular design allows certain pieces of the game interface console to be omitted for devices with less screen real estate such as wireless PDAs, web enabled cell phones, and the like. The console 200 addresses three needs: (1) facilitate playing iTrackZONE Football; (2) provide an opportune venue for sponsorship and advertising (e.g., branding for sponsors, placing ads for advertisers that are fixed and/or rotating and scheduled to appear periodically, with hyper-links for e-commerce functionality to allow the game-player to buy merchandise before, during and after the game); and (3) provide a platform for viewing streaming field-game video from broadcasters.

In one embodiment, the modular design of the console 200 includes six sections: the iTrackZONE Yardage Range Selector Module 202, the iTrackZONE Field-game Scoring Selector Module 204, the iTrackZONE Game Status Module 206, the iTrackZONE Play Selection Module 208, the iTrackZONE Game Field/Yard Marker Simulator Module 210, and the iTrackZONE Football live field-game Streaming Video Module 212.

As illustrated, the yardage range selector module 202 includes six yardage range buttons 214, 216, 218, 220, 222, and 224, and the scoring selector module 204 includes four field-game scoring buttons 226, 228, 230, and 232 and one submit or send button 234. The buttons 214-224 allow the game-player to select a yardage next play prediction, the buttons 226-232 allow the game-player to select a scoring next play prediction, and the button 234 allows the game-player to submit a next play prediction to the game-server.

In order for the game-server to award the game-player points, the game-player must select and submit a yardage next play prediction in advance of each play, as explained above. Then, the yardage gained on the subsequent play must be within the range selected by the user (e.g., a gain of 9 yards by a player is within the range of 6–10 yards). Thus, a game-player who submitted a next play prediction of 6–10 yards would be awarded points according to the offensive scoring ruleset given above (i.e., 5 points for example).

Alternatively, the game-player may score points by selecting and submitting a field-game score in advance of each play, as explained above. The field-game scoring buttons 226–232 represent four possible field-game scores that might occur during an offensive play. Because scoring does not occur on every play, selecting a scoring button 226–232 is optional. Bonus points may be scored when a game-player selects a touchdown in addition to a yardage selection button 214–224. The bonus points are, in one implementation, equal to the points awarded for a touchdown (i.e., 6 points). As noted above, however, the game-player losses points after submitting a next play prediction including a scoring prediction if the scoring prediction does not actually result on the next play.

With reference again to FIG. 2, the game status module 206 includes five fields: a down field 236 (providing the current down number), a distance field 238 (providing the distance to a first down), a Ball-On field 240 (providing the yard line on the playing field where the football is currently located), a Your-Score field 242 (providing the total points awarded to the game-player for this particular game-session), and a Last-Play-Result field 244 (providing the official result of the last play). The fields 236–242 thus represent the status of every down for each series of possession for each field-game team when it has the ball. The fields 236–242 (along with the Game Field/Yard Marker Simulator Module 210) assist a game-player to select a yardage range prior to any given field-game play. The game-player scoring is displayed in the Your-Score field 242 in conjunction with the results of every play.

The play selection module 208 displays the predicted yardage range (if any) and/or predicted scoring (if any) prior to every play, after the next play prediction has been submitted. Note that next play prediction is not only submitted to the game-server, but it is also stored locally in the remote terminal. The game-server may then transmit an actual play outcome representation to the remote terminals that allows each remote terminal to locally score the next play prediction. The game-server, however, also scores the next play prediction and stores the results in an official scoring database.

Still with reference to FIG. 2, the yard marker simulator module 210 graphically represents the game field. The yard marker simulator module 210 preferably shows the current location of the football and the first down marker before every down. The yard marker simulator module 210 may be updated for each series of downs for every offensive possession of each field-team in the field-game. The yard marker simulator module 210 includes: a Game Field color graphic 246 horizontally representing the football playing field; a first down graphic 248 across the width of the playing field that represents the current location of the first down marker; and a location graphic 250 across the width of the playing field that represents the current location of the ball. The first down graphic 248 and the location graphic 250 move in accordance with actual movement and placement of the first down marker and game ball throughout the entire game. To this end, the game-server may transmit the location for the first down graphic 248 and the location graphic 250 to each remote terminal.

In addition, the console 200 includes a video module 212. The video module 212 provides live streaming game video transmitted by the television network(s) covering the games. The streaming game video preferably runs independently of the other modules 202–210. The streaming game video also provides an important resource for watching the live game action and to see the results of any given play.

Thus, the iTrackZONE Football console 200 provides, in real time (i.e., as game events happen), interaction between the game-player and the game-server based on the underlying football game. One or more console 200 modules 202–212 (e.g., the video module 212) may be omitted on hardware platforms with limited screen real estate. A link system, tab system, or scrolling functionality may be used to view these modules. Preferably, however, at least the yardage range selector module 202 and scoring selector module 204 will be retained as the minimum. Not also that additional modules may be added to the console 200 to extend its functionality.

Note also that the console 200 includes an auxiliary display 252 that the console 200 may use to display transmitted auxiliary information including text, graphic, video, and audio based advertising, iTrackZONE informational messages, recaps of the last play, or any other type of information. Furthermore, a chat window 254 provides a text messaging area that the game-server may use to display transmitted text information including, for example, a text chat session between multiple remote terminals each executing an iTrackZONE console 200.

Figure 3:
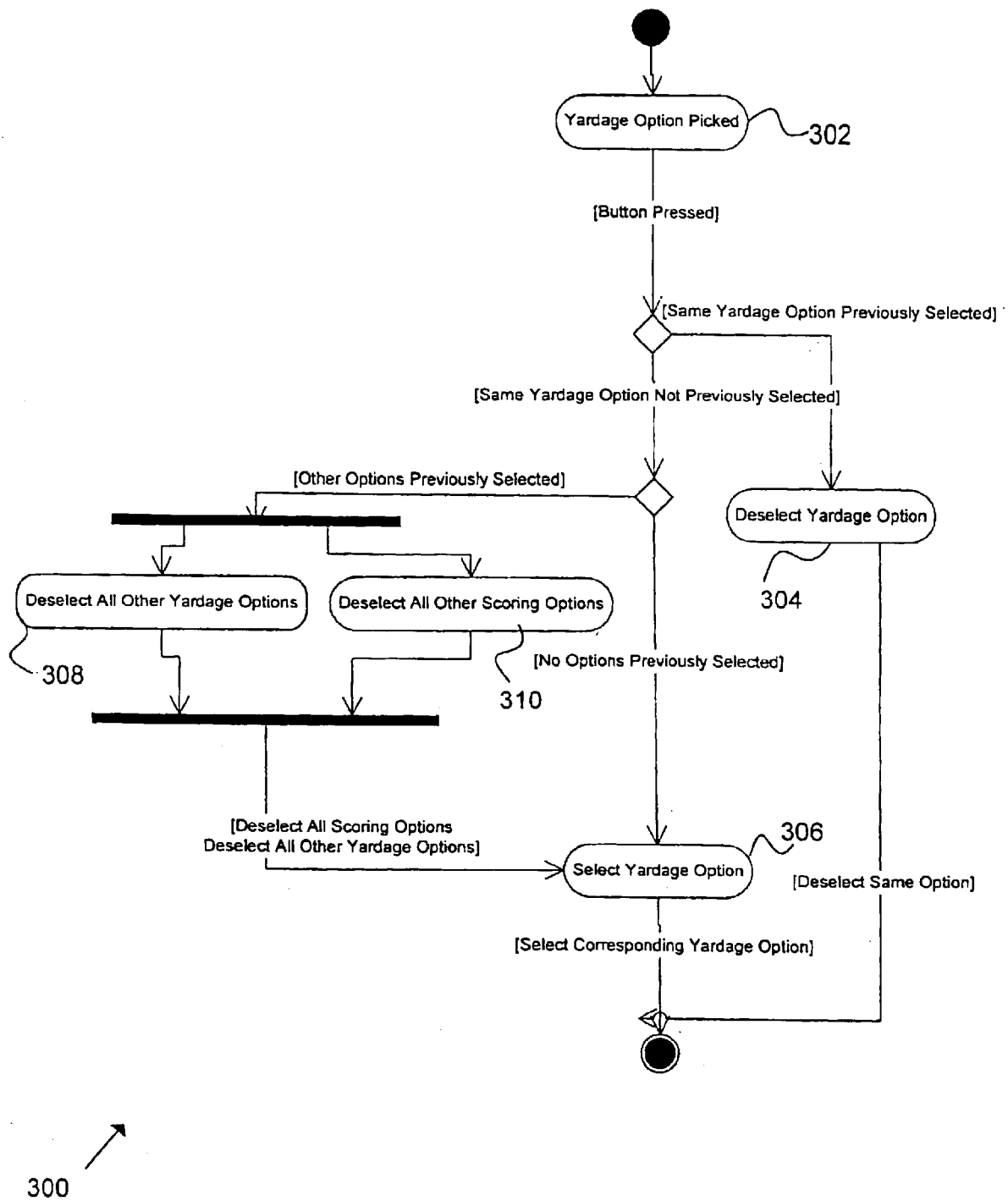
FIG. 3 illustrates a flow diagram for selecting a yardage next play prediction using a game interface console similar to the game interface console of FIG. 2, in accordance with one embodiment of the present invention.

With reference next to FIG. 3, that figure illustrates a flow diagram 300 of a flow diagram for selecting a yardage next play prediction using the game interface console 200. As an initial matter, note that the console 200 resets all button selections at the beginning of a new start-mode state (i.e., at the beginning of a submit-prediction state). In other words, the game-player does not need to manually deselect buttons that were set for the prior next play prediction. As described below, however, the game-player, during a single submit-prediction state, may select and deselect buttons.

At step 302, the game-player clicks on a yardage button 214–224. If the same yardage button 214–224 is already selected, then the console 200 deselects 304 the yardage button 214–224 previously clicked on. Alternatively, if no yardage button 214–224 is currently selected, then the console 200 selects 306 the clicked-on yardage button 214–224 (e.g., by highlighting it, changing its color, changing its shape, and the like).

Note that if other yardage selection buttons 214–224 were previously selected, the console deselects them 308. For example, yardage button 220 is selected, and the game-player selects the yardage button 218, then the console 200 deselects the yardage button 220. Similarly, if a scoring button 228–232 (i.e., other than the touchdown button 226) was previously selected, then the console 200 deselects it (step 310), because, preferably, a yardage prediction may only be submitted with a touchdown prediction. Preferably, the console 200 activates the yardage selection buttons only when the game-play is in active-mode and the game-server is in a submit-prediction-mode.

Figure 4:
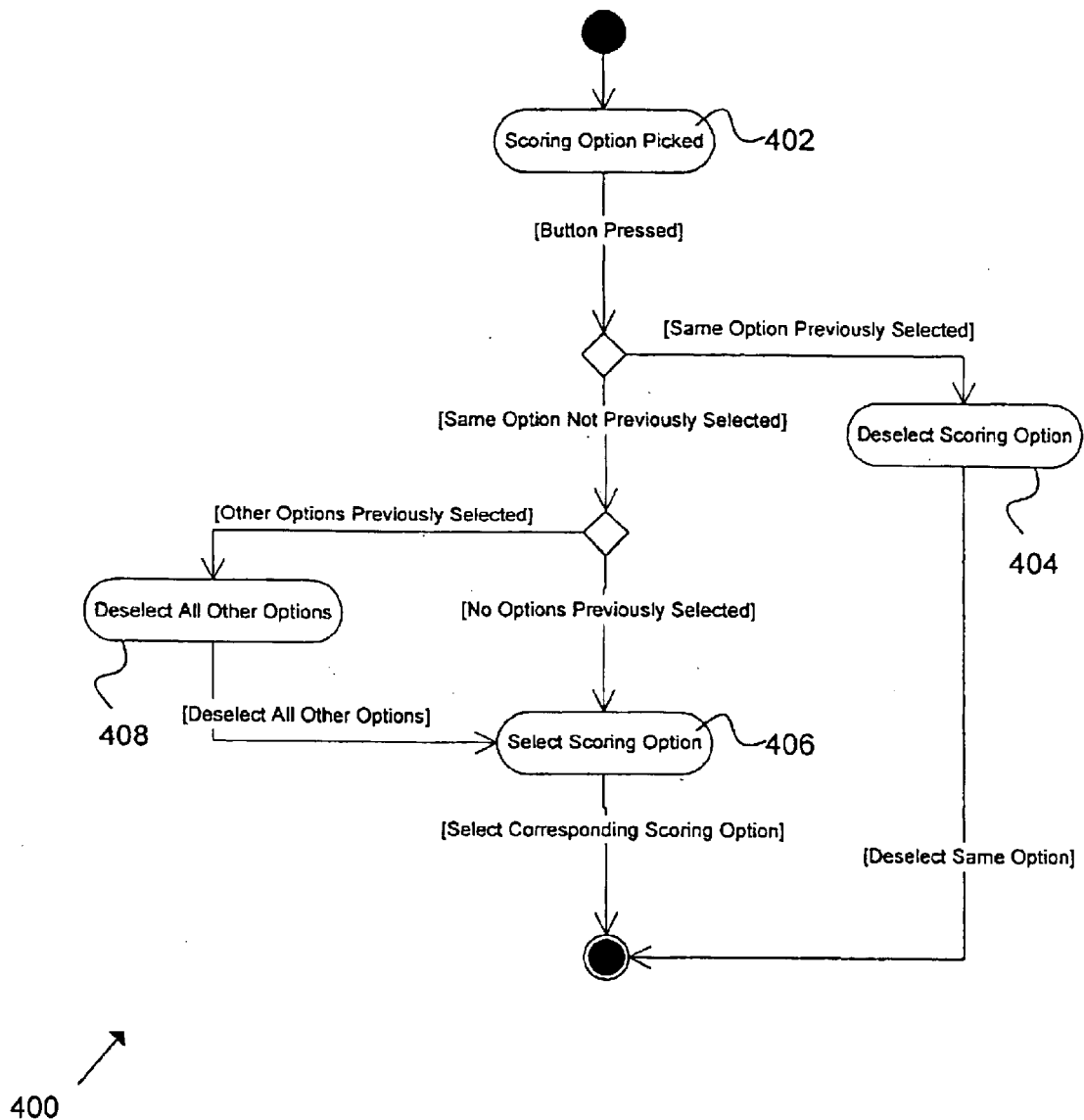
FIG. 4 illustrates a flow diagram for selecting a scoring next play prediction using a game interface console similar to the game interface console of FIG. 2, in accordance with one embodiment of the present invention.

With regard to FIG. 4, that figure illustrates a flow diagram 400 for selecting a scoring next play prediction using the game interface console 200. At step 402 the game-player clicks on a scoring button 228–232. If the same scoring button 228–232 is already selected, then the console 200 deselects 404 the scoring button 228–232 clicked on. Alternatively, if no scoring button 228–232 is currently selected, then the console 200 selects 406 the clicked-on yardage button 228–232 (e.g., by highlighting it, changing its color, changing its shape, and the like). Note that if other scoring selection buttons 228–232 were previously selected, the console deselects them 408. For example, if scoring button 228 is selected, and the game-player selects the yardage button 230, then the console 200 deselects the scoring button 228.

Figure 5:
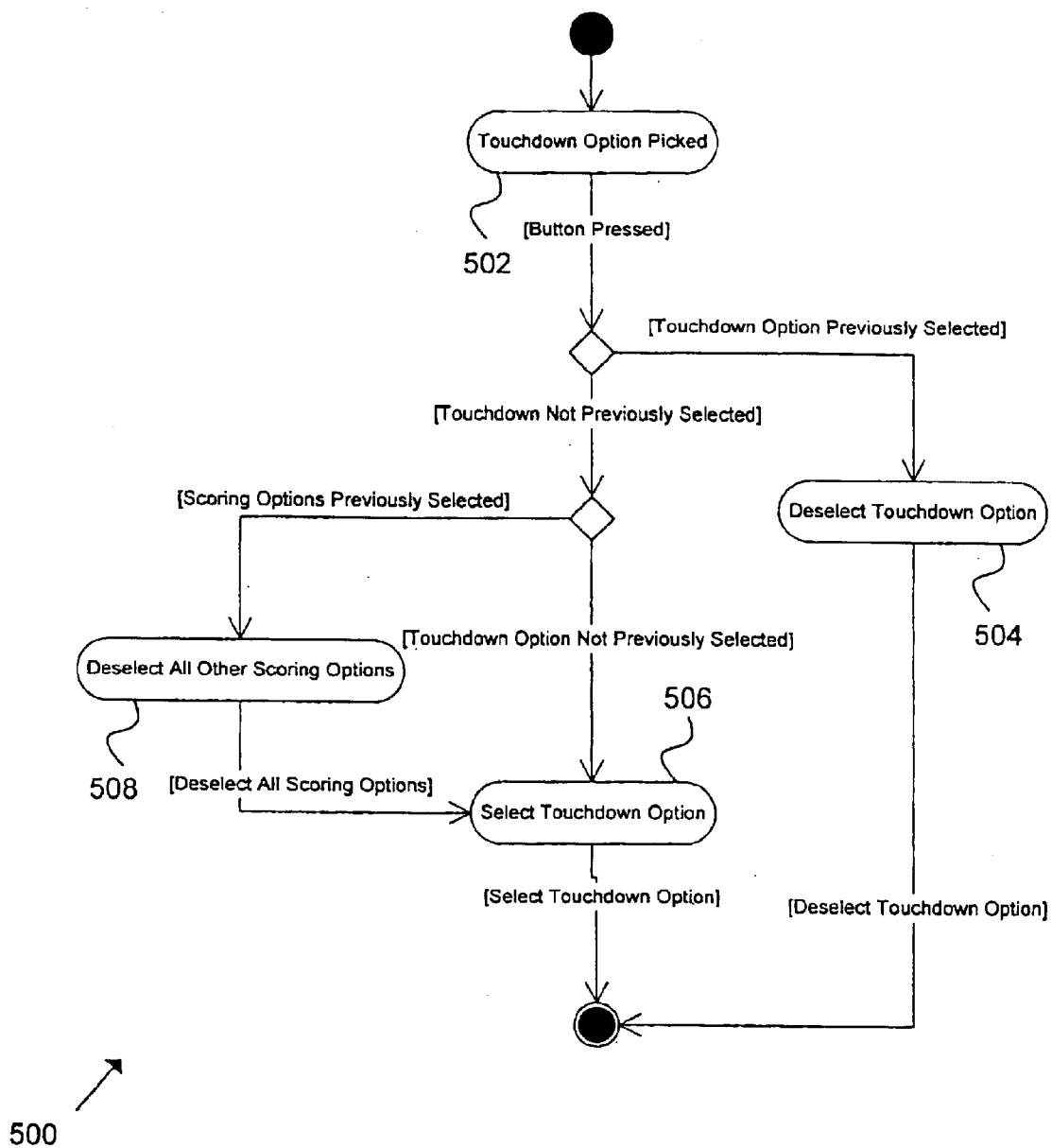
FIG. 5 illustrates a flow diagram for selecting a touchdown scoring button using a game interface console similar to the game interface console of FIG. 2, in accordance with one embodiment of the present invention.

FIG. 5 illustrates a flow diagram 500 for selecting a touchdown scoring button using the game interface console 200. At step 502 the game-player clicks on the touchdown button 226. If the touchdown button 226 is already selected, then the console 200 deselects 504 the touchdown button 226. Alternatively, if the touchdown button 226 is not currently selected, then the console 200 selects 506 the touchdown button 226. Note that if any other scoring selection button 228–232 was previously selected, the console deselects them 508. For example, scoring button 228 is selected, and the game-player selects the touchdown button 226, then the console 200 deselects the scoring button 228.

Thus, the game-player may submit: (1) a single scoring prediction; (2) a single yardage prediction, or 3) a single yardage prediction with touchdown. In other implementations, however, iTrackZONE Football may allow multiple yardage predictions, scoring predictions, or additional predictions (e.g., fumble, loss of yardage, and the like).

Figure 6:
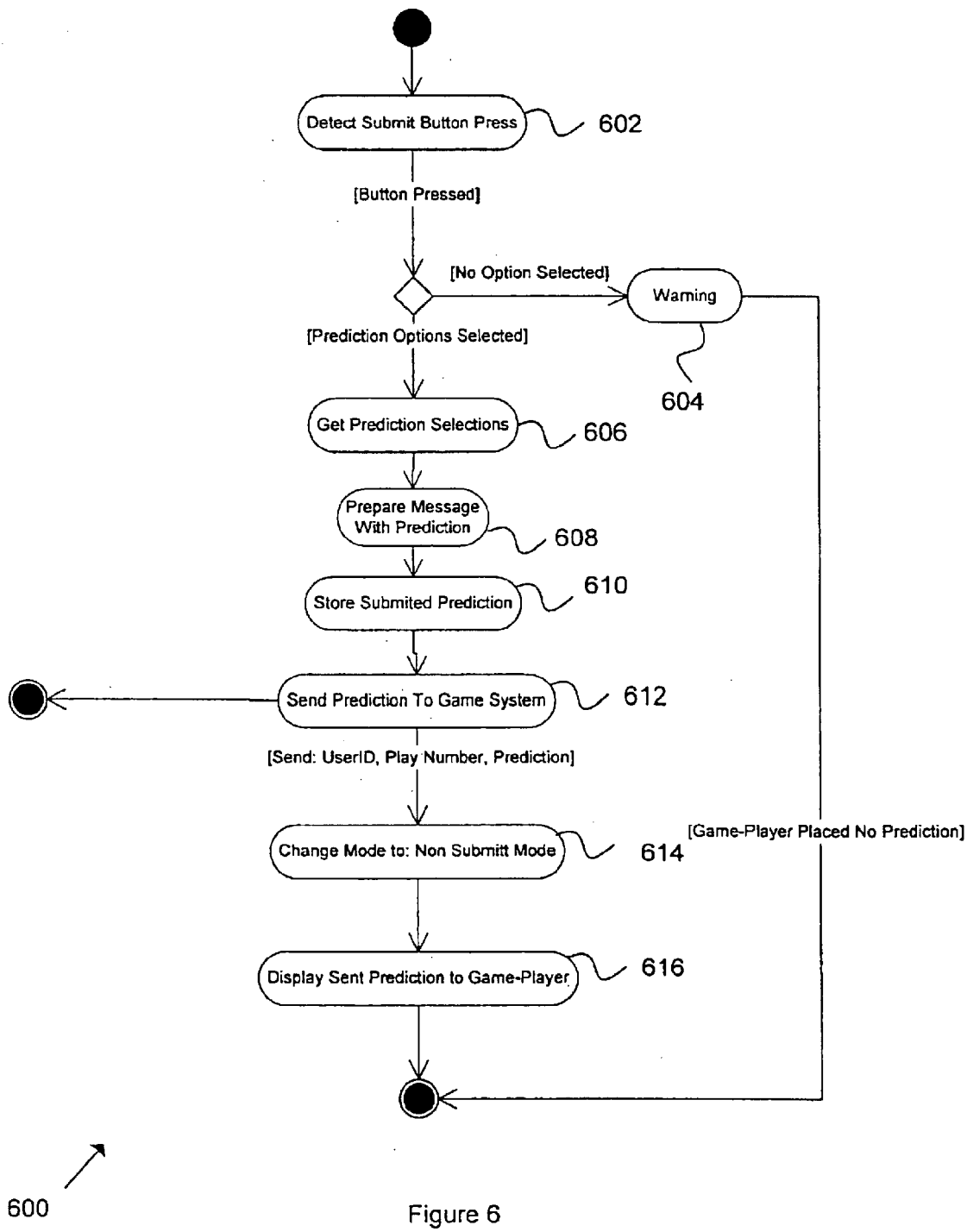
FIG. 6 illustrates a flow diagram for submitting a next play prediction to a game-server in accordance with one embodiment of the present invention.

FIG. 6 illustrates a flow diagram 600 for submitting a next play prediction to a game-server. At step 602, the console 200 detects that the game-player has pressed the Submit button 234. If the game-player did not select a next play prediction using the buttons 220–232, then the console 200 issues 604 a warning (e.g., a sound, graphic, or text display) to the game-player. If however, a next play prediction exists on the buttons 220–232, then the console 200 retrieves the next play prediction 606 and prepares a message 608 containing the next play prediction to the game-server. In addition, the console 200 stores the next play prediction locally 610.

Next, at step 612, the console 200 sends the next play prediction and other option information (e.g., game-player identification, play number, and the like) to the game server. Once the console 200 has sent the next play prediction, the console 200 changes mode to a non-submit-mode 614. In other words, preferably, the game-player can only submit a single next play prediction for any given submit-prediction-mode state. At step 616, the console 200 updates (resets) the play selection module 208 in accordance with the next play selection.

Figure 7:
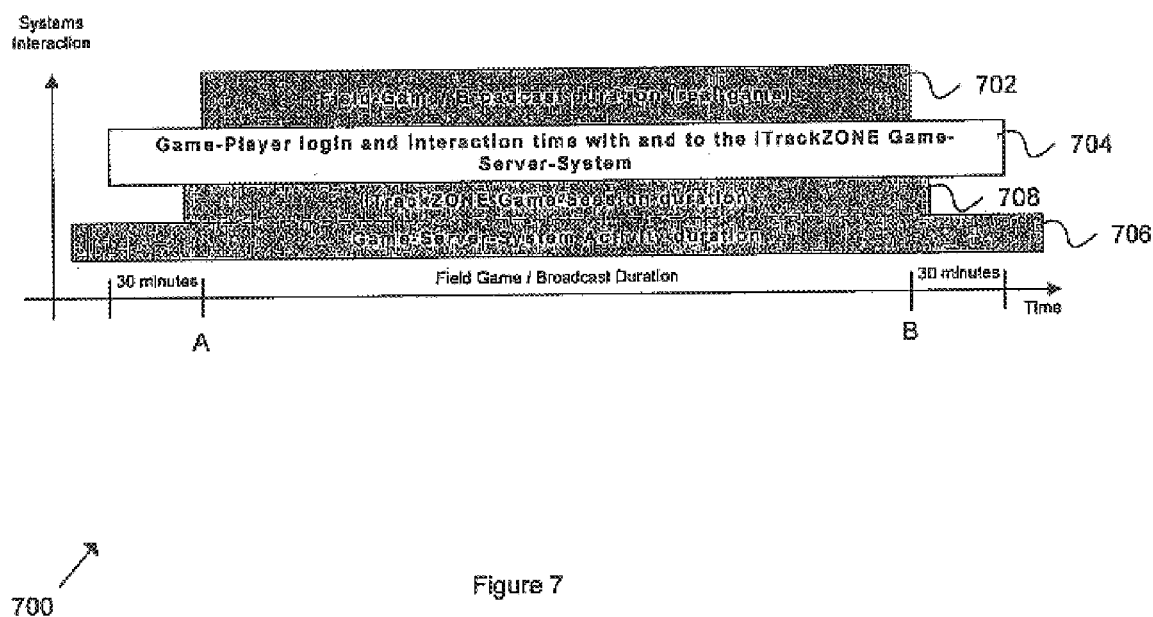
FIG. 7 illustrates a timing diagram of game-player and game-server operation in accordance with one embodiment of the present invention.

With reference to FIG. 7, a timing diagram 700 provides a high level summary of operation of iTrackZONE Football. In particular, the field-game time 702 starts (e.g., with kickoff) at point A and ends (e.g., with the final whistle) at point B. Preferably, up to 30 minutes before the game starts and until the field-game ends, a game-player may interact 704 with iTrackZONE Football game-servers (e.g., by logging in and submitting predictions). Game-server activity 706 occurs before period 704, however, in order to prepare, for example, for game-players logging in. In addition, the actual iTrackZONE Football game-session 708 extends from a few minutes before the field-game starts until a few minutes after the field-game ends. Game players may request rankings, point totals, and the like at the iTrackZONE web site any time between games.

Figure 8:
FIG. 8 illustrates a state table describing the game-server, and the remote terminal and flow of events in accordance with one embodiment of the present invention.

Turning next to FIG. 8, that figure illustrates a state table 800 with columns labeled A–K and rows labeled 1–17. The state table 800 provides one embodiment of the way in which the iTrackZONE Football states change before, during, and after a field-game. Thus, in row 2, representing more than 30 minutes before the field-game starts, all game-players, field-teams, and iTrackZONE-referees are inactive. In row 3, representing less than 30 minutes before the field-game starts, the iTrackZONE-referee, game-player A, and game-player B log in. Game-player A selects field-team C and game-player B selects field-team D.

Next, in row 4, it is assumed that team C kicks off. Thus, field-team C is in a defensive state (cell B:4), field-team D is in an offensive state (cell C:4), and the game-session (column F) is now active. The iTrackZONE-referee sends from the game-server to the remote terminals a Start signal for field-team D (cell D:4). Thus, the game-server is now in a submit-prediction state with respect to game-player B (cell J:4), while the game-server is in a default-scoring-mode for game-player A (cell I:4).

When field-team C begins its play, the iTrackZONE-referee sends a Stop signal to the remote terminals (cell D:5). In other words, play has commenced, and next play predictions may no longer be submitted for the current play. Thus, game-player B enters a non-submit-mode (cell K:5). When the current play, completes, however, the iTrackZONE-referee again sends a Start signal to the remote terminals. As a result, game-player B again enters a submit-prediction-mode (cell K:6).

The flow-of-events continues in similar fashion through cell C:10 where the state table 800 assumes that field-team C obtains possession of the football. Thus, field-team C enters the offensive state (cell B:10) and field-team D enters the defensive state (cell C:10). Because the field-game is in a play stopped state (cell G:10), game-player A is in a submit-prediction mode (cell I:10) and may submit a next play prediction. As the flow-of-events proceeds, the field-teams enter and leave defensive and offensive states, the game-players enter and leave submit-prediction-mode and non-submit-mode, with coordination by the iTrackZONE-referee (who also transmits the results of each play to the remote terminals for local scoring purposes, and to the game-server for server scoring purposes).

After the final play, both game-players enter game-stop-modes in which no next play predictions are allowed (cells I:15 and K:15), the field-teams become inactive (cells B:15 and C:15), and the game-server enters a stopped state (cell E:15). The game-players may then proceed to logout (cells H:16 and J:16), with the game-server entering an inactive state (cell E:17), for example, 30 minutes after the end of the game.

Figure 9:
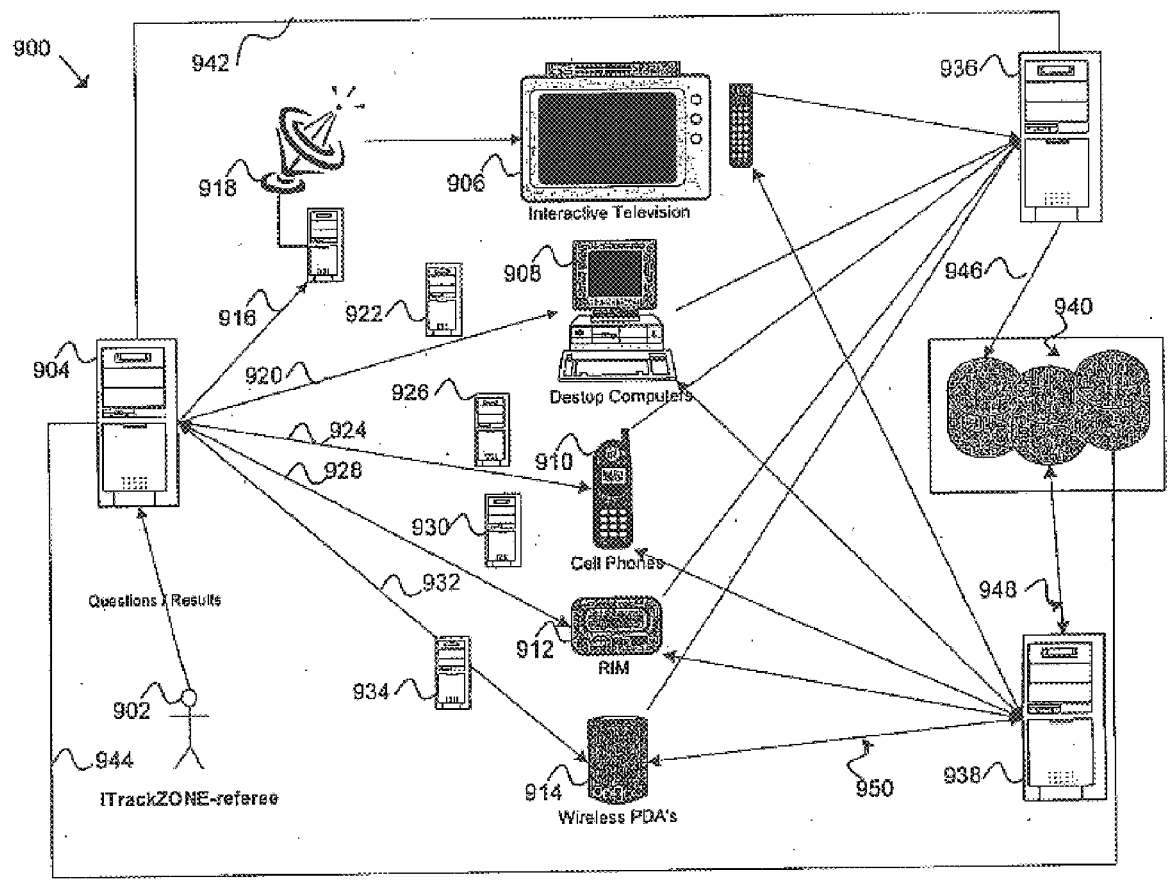
FIG. 9 illustrates a network connection diagram in accordance with one embodiment of the present invention.

Turning next to FIG. 9, this figure illustrates a connection diagram of an iTrackZONE network 900. In order to facilitate explanation, the network 900 is described with regard to information flow around the network 900, beginning with the iTrackZONE-referee 902. The iTrackZONE-referee 902 inputs field-game play results (e.g., a gain of 12 yards, field goal, sack, fumble recovery, and the like), state-changes (e.g., shown in the state table 800), and other information (e.g., trivia questions, and the like) to the game-server 904.

Subsequently, the game server 904 propagates outgoing data to one or more of the exemplary remote terminals, including, without limitation, an interactive television 906, a desktop computer 908, a cell phone 910, a pager 912, and a wireless Personal Data Assistant 914 (e.g., a PalmPilot). Thus, the game-server 904 communicates the outgoing data over the network link 916 to the television transmitter system 918. As an example, the game-server 904 may communicate an actual play outcome representation (i.e., a data representation of the outcome of a field-game play that may be decoded and processed by the remote terminals 906-914). In turn, the television transmitter system 918 formats the outgoing data for transmission on a preselected television station for reception by the interactive television 906.

Similarly, the game-server 904 may communicate the outgoing information through the network link 920 (e.g., over the Internet or a local network) through the intermediate gateway 922 to the desktop computer 908. The game-server 904 may also send the outgoing information through the network link 924 to a cellular base station 926 to the cellular phone 910. As another alternative, the game-server 904 may send the outgoing information through the network link 928 to the paging transmitter 930 for delivery to the pager 912. Still another option is for the game-server 904 to transmit the outgoing information over the network link 932 to the PDA transmitter 934 for delivery to the wireless PDA 914.

As noted above, when the remote terminals receive an actual play outcome representation, they score the next play prediction, if any, stored locally in the remote terminal. Furthermore, the remote terminals may also display other received outgoing information, such as streamed video, auxiliary information or text information including trivia questions, advertising, announcements, and the like. It is noted that where the remote terminal provides for transmit capability (e.g., as with the desktop computer 908), the remote terminals may also send information (e.g., next play predictions, trivia question answers, merchandise purchase selections, and the like) back to the iTrackZONE answer server 936.

Continuing with reference to FIG. 9, note also that the game-server-system may optionally include an iTrackZONE web server 938, iTrackZONE database manager 940. In particular, the web server 938 may communicate with the terminals 906–914 to handle username and password validation, new game-player registration, general web browsing, merchandise purchase, and the like. The answer server 936 may comprise a network connected server that receives trivia answers and next play predictions from the remote terminals 906–914. The answer server 936, the web server 938, the game-server 904, and the remote terminals 906–914 may bidirectional communicate with the game database manager 940 over the network links 942, 944, 946, 948, 950, and 951.

Thus, the iTrackZONE database manager 940 may hold a central repository of field-game and game-player information, statistics, merchandise order information, and the like. As one example, the database manager 940 may store game-player point totals for subsequent retrieval (including by the remote terminals 906–914), ranking, and awards. As another example, the database manager 940 may store each next play prediction from each game-player. Thus, the game-server 904 or iTrackZONE-referee 902 may communicate actual play outcome representations to the database manager 940 through the answer server 936. The database manager 940 may then apply offensive and defensive scoring rulesets to each game-player's next play prediction and obtain an official running tally of each game-player's point total.

The network links illustrated in FIG. 9 may be implemented as terrestrial wire or wireless links, satellite links, and combinations of terrestrial and satellite links. As a result, the remote terminals 906–914 may be distributed around the world.

Figure 10A:
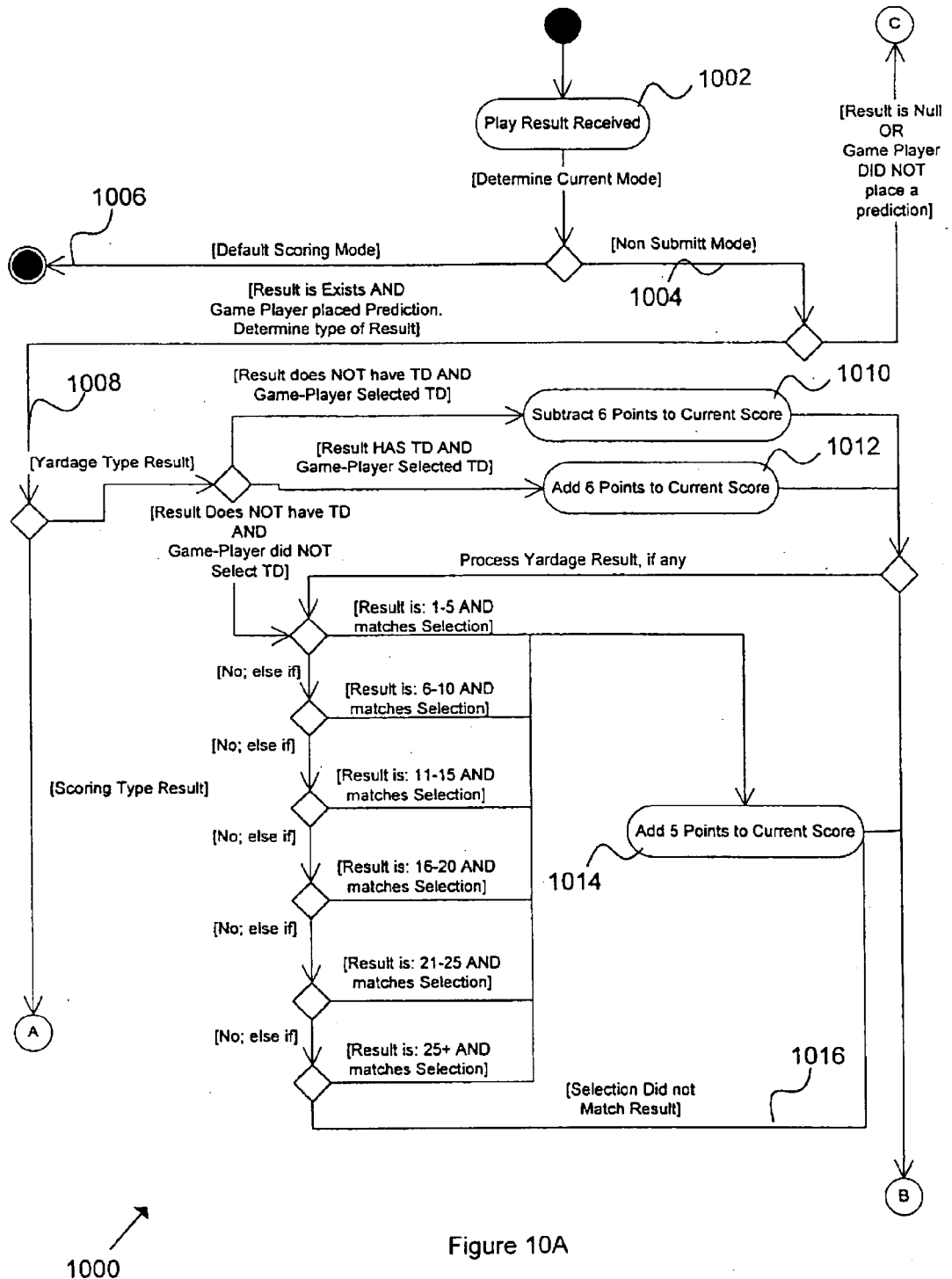
FIGS. 10A and 10B illustrate the flow of active mode scoring in accordance with one embodiment of the present invention.
Figure 10B:
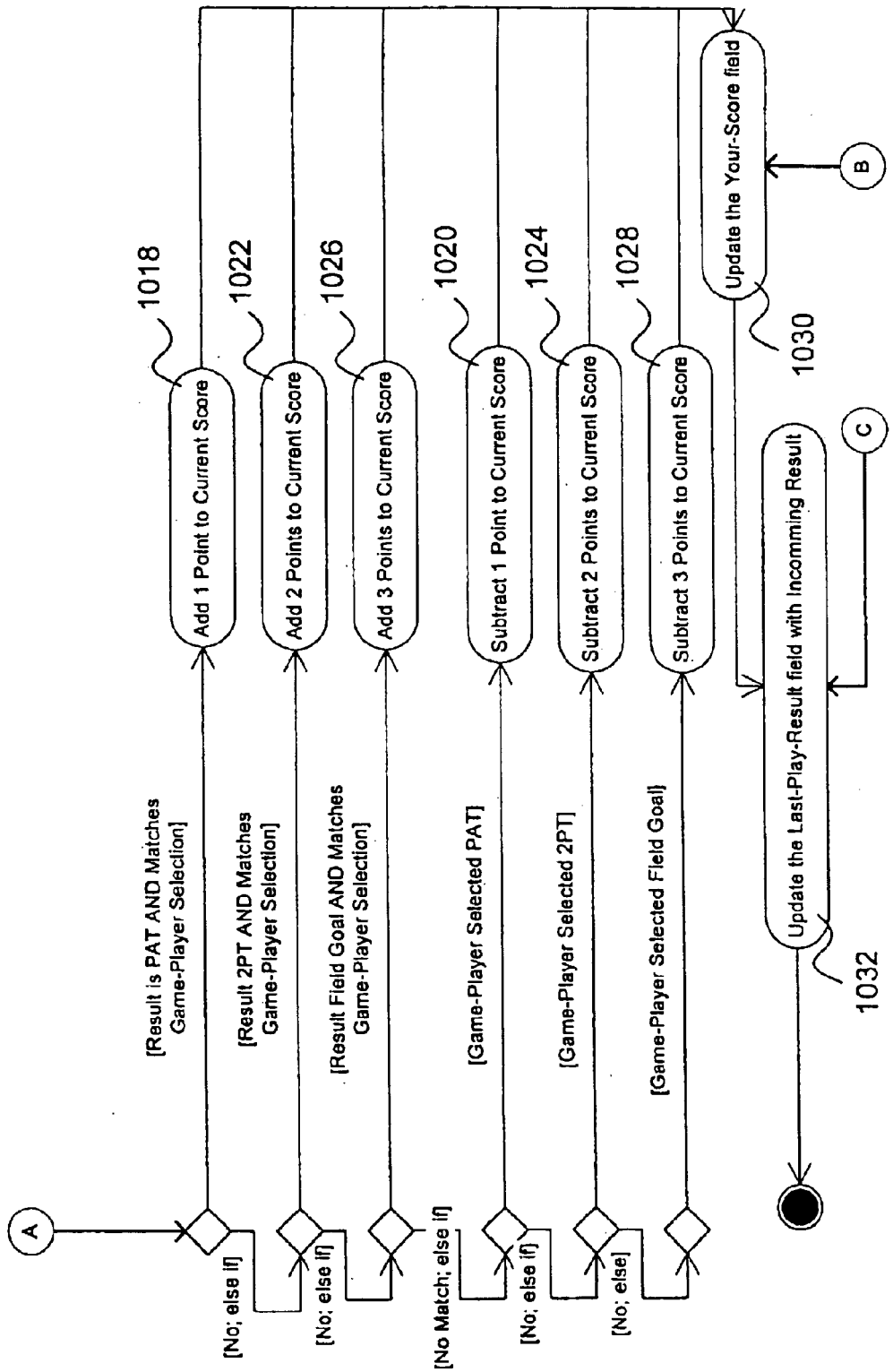

Turning next to FIG. 10, this figure illustrates a flow diagram 1000 of active mode scoring. Updating the game-player's score proceeds according to the offensive scoring ruleset in Tables 3 and 4. First, a remote terminal receives an actual play outcome representation 1002 (e.g., from the game-server 904) for the field-team on offense. If the remote terminal is in the non-submit mode, then the remote terminal proceeds 1004, as noted below, to update the game-player's score. Otherwise, the remote terminal proceeds 1006 to the Default Scoring Mode illustrated in FIG. 11.

As an initial matter, note that if the game-player has not placed a next play prediction or if the result is NULL (i.e., no scoring for this offensive play is applicable to what occurred on the play-field), then processing follows branch C. Otherwise the remote terminal determines 1008 whether the result is a yardage result (i.e., including yardage and/or touchdown information) or a scoring result (i.e., including scoring information other than touchdown information). A remote terminal processes a scoring result under branch A described below.

With reference first to a yardage result, if the next play prediction included a touchdown, but no touchdown was scored, then the remote terminal subtracts 1010 six points from the player's score. When the play outcome includes a touchdown, the game-player is awarded 1012 six points for example if the game-player's next play prediction included a touchdown. The result may also include a yardage result. As set forth above in Table 3, a next play prediction that matches the yardage result causes the remote terminal to add 1014 five points for example to the game-player's score. No points are subtracted for an incorrect yardage prediction (as shown by branch 1016). Processing then continues at branch B.

As noted above, when the play outcome includes a scoring result other than a touchdown, then processing continues along branch A. In particular, if the result includes a point-after-touchdown, the remote terminal adds 1018 one point to the score when the next play prediction specified a point-after touchdown, and subtracts 1020 one point from the score when the next play prediction specified a point-after-touchdown, but none was scored. Similarly, if the result includes a two point conversion, the remote terminal adds 1022 two points to the score when the next play prediction specified a two point conversion, and subtracts 1024 two points from the score when the next play prediction specified a two point conversion, but none was scored. In addition, if the result includes a field goal, the remote terminal adds 1026 three points to the score when the next play prediction specified a field goal, and subtracts 1028 three points from the score when the next play prediction specified a fieldgoal, but none was scored.

Branches A and B converge at the point where the remote terminal updates 1030 the Your-score field 242 on the console 200. Branches A, B, and C meet at the point where the remote terminal shows 1032 the offensive play result in the Last-Play-Result field 244 (as examples, a gain of 20 yards, field goal, or no scrabble play).

Figure 11:
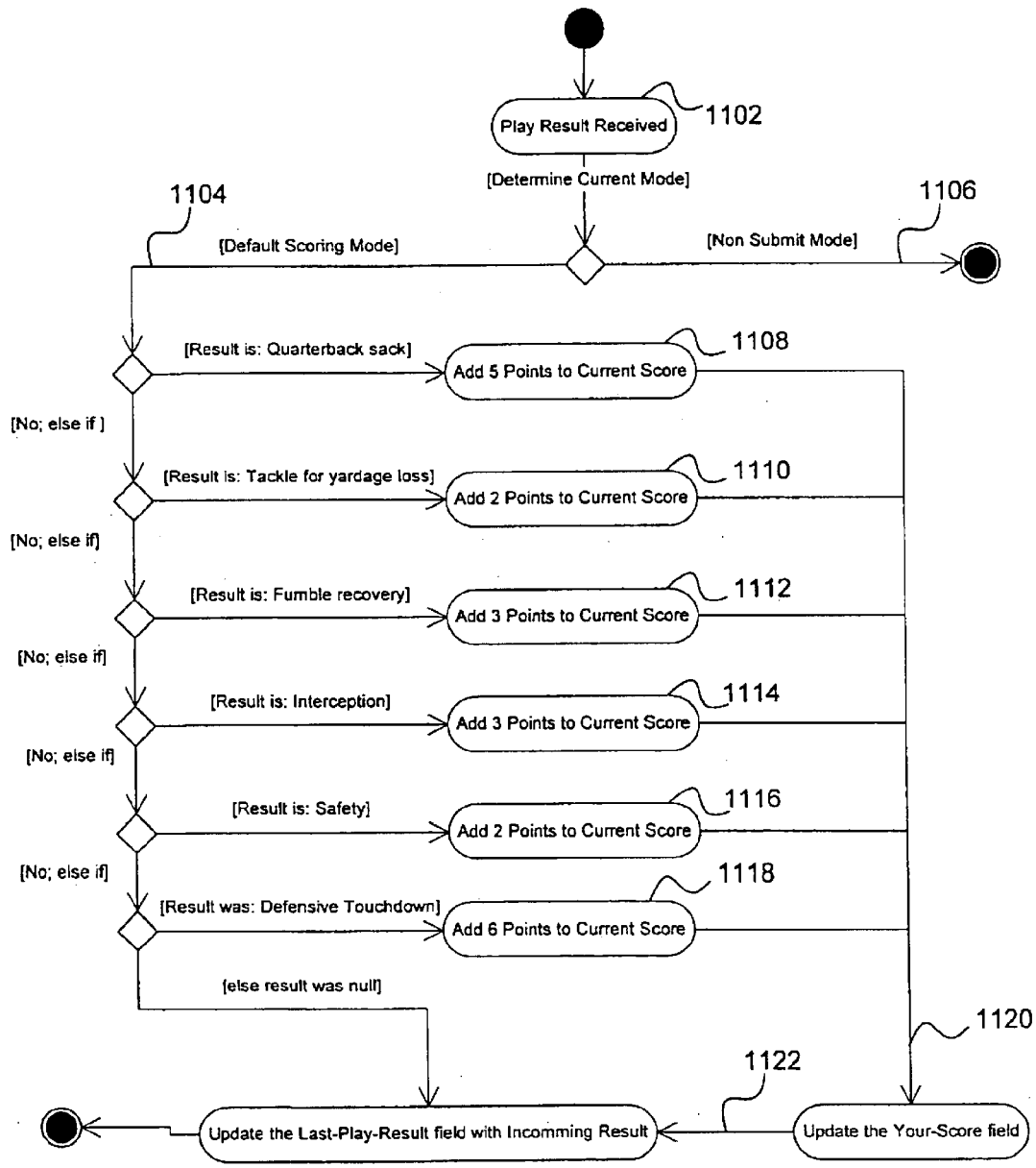
FIG. 11 illustrates a flow of passive mode scoring in accordance with one embodiment of the present invention.

With regard to FIG. 11, this figure illustrates a flow diagram 1100 of passive mode scoring. First, a remote terminal receives 1102 an actual play outcome representation (e.g., from the game-server 904) for the field-team on defense. If the remote terminal is in the default-scoring-mode, then the remote terminal proceeds 1104, as discussed below, to update the player's score. Otherwise, the remote terminal proceeds 1106 to Active Scoring Mode as illustrated in FIG. 10.

As noted above with regard to the defensive scoring ruleset in Table 5, if the defensive play outcome is a quarterback sack, then the remote terminal adds 1108 five points to the game-players' score. Similarly, if the defensive play outcome is a tackle for yardage loss, then the remote terminal adds 1110 two points to the game-players' score. If the defensive play outcome is a fumble recovery, then the remote terminal adds 1112 three points to the game-players' score. If the defensive play outcome is an interception, then the remote terminal adds 1114 three points to the game-players' score. When the defensive play outcome is a safety, then the remote terminal adds 1116 two points to the game-players' score. When the defensive play outcome is a defensive touchdown, then the remote terminal adds 1118 six points to the game-players' score.

After determining the new total for the game-player's score, the remote terminal updates 1120 the Your-score field 242 on the console 200. In addition, the remote terminal shows 1122 the defensive play result in the Last-Play-Result field 244.

Figure 12:
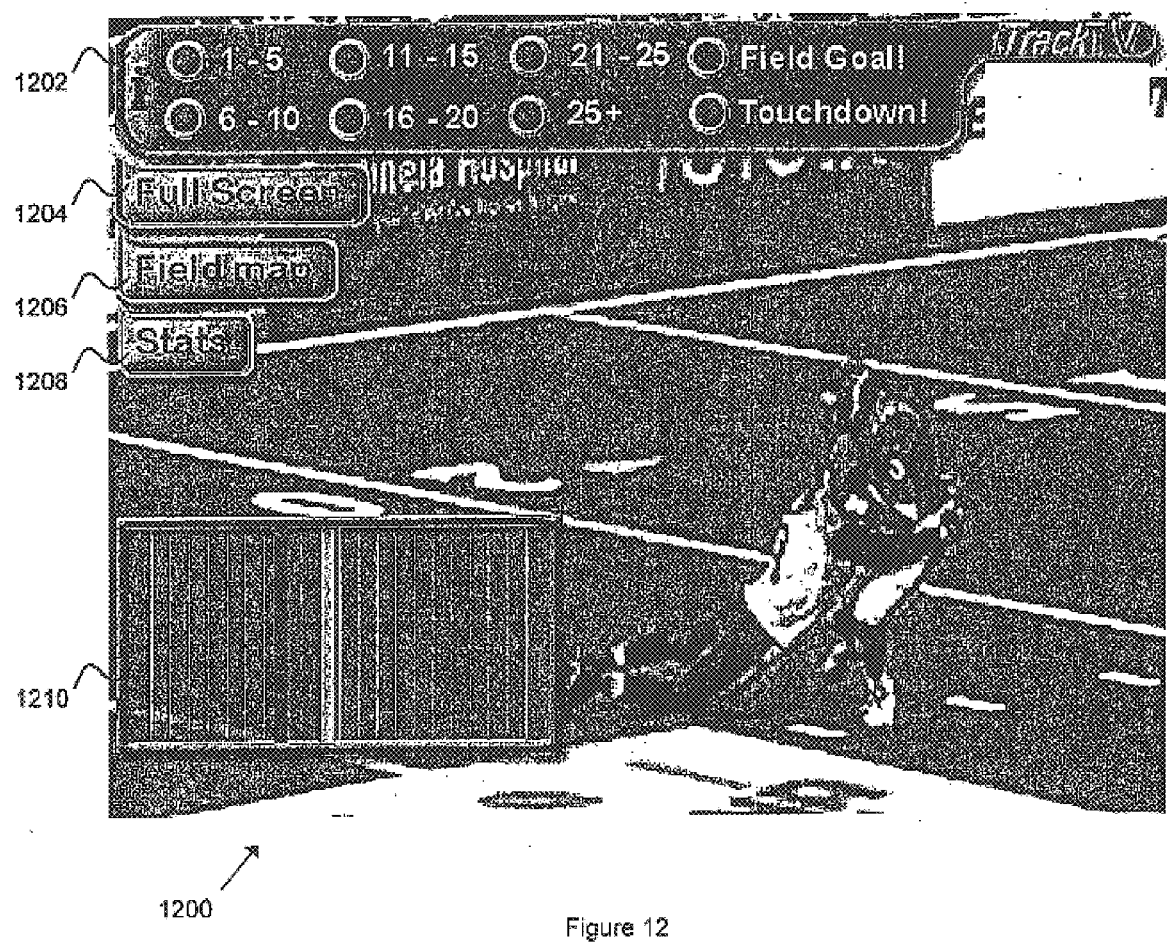
FIG. 12 illustrates a game interface that provides a user interface for playing iTrackZONE football on an interactive TV system in accordance with one embodiment of the present invention.

As noted above, iTrackZONE Football may be played on a variety of remote terminals. Turning next to FIG. 12, this figure illustrates one embodiment of a console 1200 that provides a user interface to iTrackZONE football on an interactive TV system (e.g., a WebTV™ system). The user interface 1200 overlays a television broadcast signal and provides a combined yardage range and scoring selector module 1202, a Full-Screen button 1204, a Field-map button 1206, and a Stats button 1208.

The Full-screen button 1204 switches the interactive television into a picture-in-picture mode that supports conventional web browsing operations. The Field-map button 1206 toggles the presentation of the Game Field/Yard Marker Simulator module 1210. Similarly, the Stats button 1208 toggles the presentation of the Game Status Module (not shown). Detailed information on the modules is presented above with reference to FIG. 2. Note, however, that the toggle function is used to show or hide selected modules at selected times, as desired by the game-player, or in keeping with the amount of screen real estate available for the console 1200.

Thus, iTrackZONE provides a user friendly, easy to understand and play, interactive realtime distributed game. Next play predictions are scored locally at each remote terminal, while being scored officially within the game-server network. The iTrackZONE network configuration further provides each remote terminal with trivia, merchandising, and other informational and retail services.

iTrackZONE Glossary:

Active-game-state: A state describing that the game-system is active in processing next play predictions and the like. The game-server enters the active-game-state, for example, 5–30 minutes prior to the start of the field-game.

Active-mode: a mode assigned to a game-player when the preselected-team is in the offensive-state. The active-mode allows the game-player to take specific actions and makes specific options available to the game-player.

Default-scoring-mode: A state that exists when the game-player's preselected-team is in a defensive-mode. Points are scored by default and attributed to the game-player when that game-player's preselected-team scores points in the field-game.

Defensive-state: a state assigned to the field-team when it does not have possession of the ball in the Field-Game. This state affects the actions and options available to the game-players that have chosen that field-team to be their selected-team.

Field-game: refers to the actual physical football game that is ongoing for the duration of a game session.

Field-teams: the teams that are playing football in the Field-Game.

Flow-of-events: The flow-of-events refers to the actions that happen through time after the commencement of the Field-Game. The Flow-of-events will dictate the actions taken by the game-server and how a game-player may interact with the iTrackZONE game at any instant in time. The Flow-of-events provides specific game states and game-player modes to the game-players, the play-action results, the start and stop of the Field-Game clock, and the like, until the end of the Field-Game and game session.

Game-player: the person playing iTrackZONE using the iTrackZONE game system.

Game-server: a system comprised of a server or a group of servers that handle the iTrackZONE game flow-of-events, game-players actions, and the like.

Game-session: The game-session starts, preferably, 30 minutes before the actual Field-Game starts (the field-game starts at kick-off) and the game-system becomes active. The game-session lasts until the end of the Field-Game.

Inactive-game-state: refers to a state of the game-server during which the game-server is considered to be inactive, i.e., prior to the commencement of the Active-game-state (e.g., prior to 30 minutes before the scheduled kick-off in the Field-Game and/or after the Field-Game and game-session have finished).

iTrackZONE Referee: The Game-session official(s) for the iTrackZONE game. The iTrackZONE Referee will monitor the flow-of-events of the Field-game to determine the states of the game-server during the game session. The iTrackZONE Referee instructs the game server to transmit the play results of each play to allow processing of the next play predictions, and set the start and stop prediction states that determine the prediction modes for the game-players.

Non-submit-mode: The non-submit-mode coincides with the duration of the play-action-state of a game-players preselected field team. The non-submit-mode begins when a game-player's preselected-team breaks the huddle to approach the ball to commence a play in the field-game, initiating the play-action-state. During the non-submit-mode, a game-player in active-mode cannot submit next play predictions. A game-player is also automatically placed in a non-submit-mode when he selects and submits a next play prediction to the game-system. In one embodiment, the next play prediction submission is irrevocably submitted to the game-system and temporarily suspends that game-player's game session, placing the game-player into the non-submit mode. Thus, preferably, the game-player cannot make a different selection and submission until after the ball is blown dead by a field referee and the next submit-prediction-mode begins.

Offensive-state: a state assigned to the field-team when it has possession of the ball in the Field-Game. The offensive-state affects the actions and options available to the game-players that have chosen that field-team to be their selected-team.

Passive-mode: a mode assigned to a game-player when the preselected-team is in defensive-state. In passive-mode, the game-player will not be able to select or submit any predictions until his preselected-team assumes an offensive-state.

Play-action-state: refers to a state of the overall game-system that corresponds with the live action football plays in the Field-Game. The play-action-state begins when the ball is snapped and ends when a Field-Game official blows the whistle to indicate a dead ball. When the game-system is in the Play-action-state a game-player is not allowed to select and submit predictions.

Play-stopped-state: refers to a state of the game-system that corresponds with the live action football plays in the Field-Game. The play-stopped-state begins when a Field-Game official blows the whistle to indicate a dead ball. When the game-system is in the Play-stopped-state a game-player is allowed to select and submit predictions.

Preselected-team: the Field-team a game-player selects to side with prior to the commencement of the game-session and field-game. The preselected-team will determine the flow of events in the game-session and options available to that specific game-player or any other game-player that has chosen to side with that specific field-team.

Remote terminal: the game apparatus, software or a machine that communicates between the game-server and the game-player, allowing the game-player to send and receive information synchronously or asynchronously.

Submit-prediction-mode: the Submit-prediction-mode is determined, preferably, by the iTrackZONE-referee and starts when the ball is dead and ends when the ball is live or snapped. In the submit-prediction-mode, a game-player in active-mode can submit next play predictions.

Submit-prediction-state: The Submit-prediction-state, preferably determined by the iTrackZONE referee, starts when the ball is dead and ends when the ball is live or snapped. In the submit-prediction-state, a game-player in active-mode can submit a next play prediction.

While the invention has been described with reference to a preferred embodiment, those skilled in the art will understand that various changes may be made and equivalents may be substituted without departing from the scope of the invention. In addition, many modifications may be made to adapt a particular step, structure, or material to the teachings of the invention without departing from its scope. Therefore, it is intended that the invention not be limited to the particular embodiment disclosed, but that the invention will include all embodiments falling within the scope of the appended claims.

What is claimed is:

1. A method for playing an interactive distributed game, the method comprising:

transmitting a play prediction to a scoring database on a game server;

determining an actual play outcome;

transmitting an actual play outcome representation to a remote terminal; and scoring said play prediction based on said actual play outcome.

2. The method of claim 1, including transmitting said play prediction and determining said actual play outcome for a sporting event.

3. A method for playing an interactive distributed game, the method comprising:

receiving a next play prediction for a sporting event at a scoring database on a game server;

determining an actual play outcome for said sporting event;

transmitting an actual play outcome representation; and scoring said play prediction based on said actual play outcome.

4. The method of claim 3, including transmitting said next play prediction to said scoring database using a remote terminal.

5. The method of claim 4, including storing said next play prediction locally on said remote terminal.

6. The method of claim 3, including storing said next play prediction on said scoring database.

7. The method of claim 3, including transmitting said actual play outcome representation to a remote terminal.

8. The method of claim 3, wherein receiving said next play prediction comprises receiving at least one of a yardage prediction and a scoring prediction.

9. The method of claim 3, wherein transmitting comprises at least one of transmitting over a network, transmitting over a radio channel, and transmitting over a television channel.

10. The method of claim 3, wherein scoring comprises awarding points when said next play prediction is a correct yardage prediction.

11. The method of claim 10, wherein scoring further comprises awarding points when said next play prediction is a correct scoring prediction.

12. The method of claim 3, further comprising transmitting a defensive play outcome representation and scoring said defensive play outcome.

13. The method of claim 3, further comprising transmitting video of said sporting event.

14. The method of claim 3, further comprising transmitting auxiliary information.

15. The method of claim 3, further comprising transmitting text information.

16. An interactive distributed game comprising:

a game server adapted to determine a play-stopped-state and receive a next play prediction during a submit-prediction-mode over a communication interface; and a remote terminal adapted to submit said next play prediction to said game server, the remote terminal responsive to an actual play outcome representation to update a participant score based on the actual play outcome and said next play prediction.

17. The interactive distributed game of claim 16, further comprising a scoring database storing a participant score in a scoring memory.

18. The interactive distributed game of claim 16, wherein said next play prediction is one of a yardage prediction and a scoring prediction.

19. The interactive distributed game of claim 16, wherein said remote terminal is further responsive to a defensive play outcome to update the participant score.

* * * * *